Dec. 1, 1942.　　　D. M. WOLCOTT　　　2,303,808
FLUID FLOW CONTROL MEANS
Filed Oct. 7, 1939
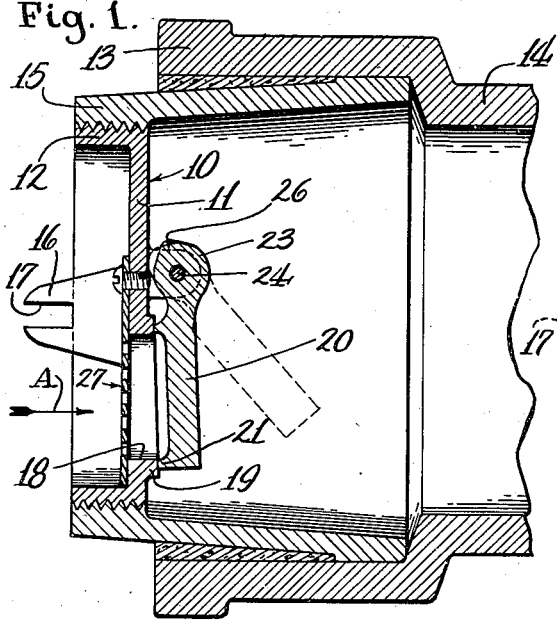
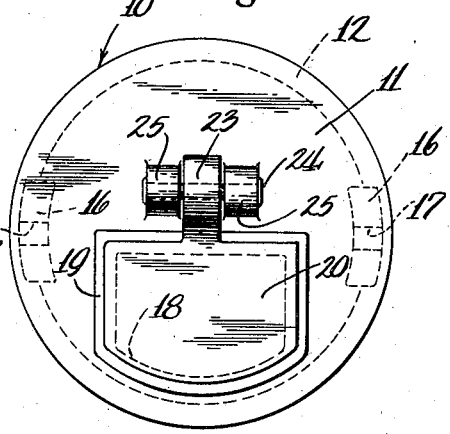
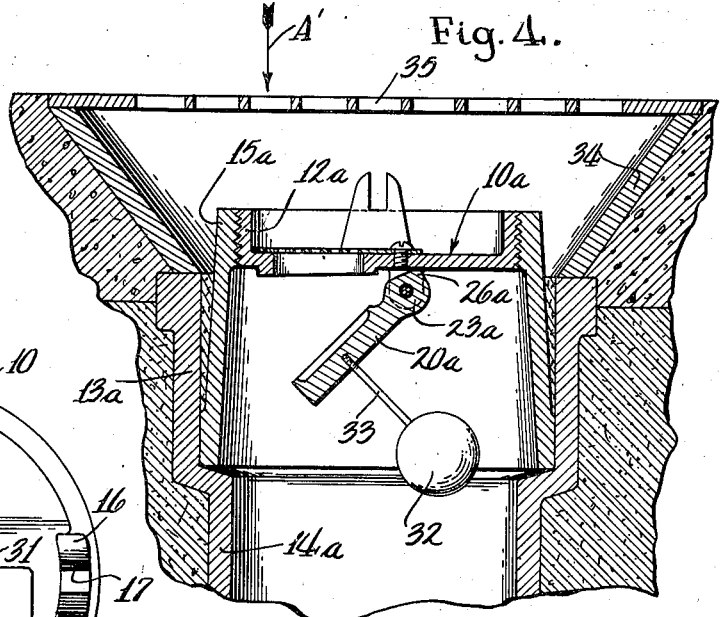
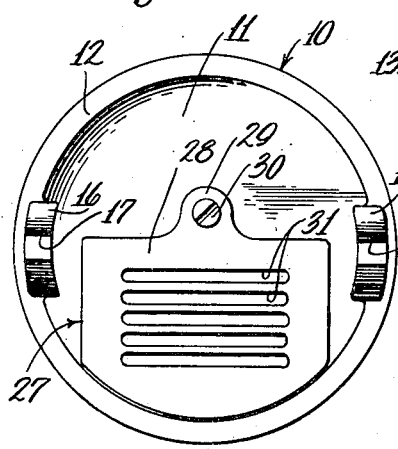
Dewey M. Wolcott
INVENTOR
By Freeman, Swett, Albrecht, and Weidman
ATTORNEYS Patented Dec. 1, 1942

2,303,808

UNITED STATES PATENT OFFICE 2,303,808

FLUID-FLOW CONTROL MEANS

Dewey M. Wolcott, Sandusky, Ohio

Application October 7, 1939, Serial No. 298,451

4 Claims. (Cl. 210—166)

My invention relates to fluid-flow control means, and more particularly to control means for preventing back-flow of fluid through a conduit. The principal object of my invention is to provide new and improved fluid-flow control means of the character mentioned.

In the drawing accompanying this specification, and forming a part of this application, I have shown, for purposes of illustration, various forms which my invention may assume, and in this drawing:

Figure 1 is a broken sectional view illustrating an embodiment of the invention applied to a fluid conduit, Figure 2 is a plan view of one side of the embodiment, the conduit and the retaining ferrule being omitted, Figure 3 is a plan view of the opposite side of the embodiment, and Figure 4 is a broken sectional view showing a different embodiment applied to a fluid conduit.

The embodiment shown in Figures 1 through 3 comprises generally cup-shaped disc means 10, preferably cast and formed of brass. The disc means 10 includes a plate section 11, and an exteriorly screw-threaded flange 12 margining the plate section 11. The disc means 10 is adapted to be inserted within a conduit, in position to span the passage through the conduit, and may be held in such position in any suitable manner. As here shown, the disc means 10 is inserted within the bell portion 13 of a conduit 14, the disc means 10 being smaller than the inner diameter of the bell portion 13, and being screw-threadedly received within a ferrule or ring 15 which is cemented or otherwise suitably secured within the bell portion 13. As here shown, the ferrule 15 is somewhat longer than the bell portion 13, and has its inner end abutting a shoulder formed by the bell portion, and its outer end extending outwardly of the bell portion 13 and formed with interior screw-threads for receiving and holding the screw-threaded flange 12. Integral with the disc means 10 is a pair of diametrically opposed lugs 16, extending from one side of the plate section 11 and beyond the flange 12, the terminating end of each lug 16 being slotted, as shown at 17, for the purpose of receiving a spanner wrench (not shown) so that the disc means 10 may be conveniently assembled with or disassembled from the ferrule 15.

The plate section 11 is preferably formed with an off-center opening 18, the lower margin, referring to Figures 1 and 2, of which is generally concentric with the inner defining surface of the flange 12. The side and top margins of the opening 18, again referring to Figures 1 and 2, are generally rectilinear and at right angles to each other, as best seen in dotted lines in Figure 2. Extending from one side of the plate section 11 is a seat forming portion 19 margining the opening 18 in the plate 11, the seat portion 19 terminating in a plane seating surface inclined with respect to the adjacent surface of the plate section 11, as best seen in Figure 1.

Valve means are provided for controlling fluid flow through the opening 18, the valve means being so constructed and arranged to provide for fluid flow through the conduit 14 in one direction, but prevent flow of fluid in the opposite direction.

As here shown, the valve means comprises a flap valve 20, preferably formed of aluminum, and having a contour generally similar to the contour of the opening 18, but of such size as to overlie the opening. The flap valve 20, on its one side, is formed with a recess intermediate its margins to provide a relatively narrow seat engaging portion 21. The flap valve 20 is formed with an integral lug 23 which is pivoted about a pintle 24 carried by a pair of lugs 25 extending from the plate section 11. The valve lug 23 is provided with an extending portion 26 so positioned that it will engage the adjacent surface of the plate section 11 when the flap valve 20 is opened a predetermined amount, as for instance the amount shown in dotted lines in Figure 1, thus limiting opening movement of the flap valve 20. The valve means in this embodiment is normally biased to closed position, and in the construction disclosed in Figures 1 through 3, the flap valve 20 is so constructed and arranged that its weight normally urges it to the closed position, such closing being further insured by reason of the inclination of the terminating surface of the seat portion 19.

Positioned to overlie the surface of the plate section 11 opposite the valve 20 is a screen means 27, preferably formed of brass, and here shown as being in the form of a plate 28 having a contour generally similar to the contour of the opening 18, but being of a greater size so as to overlie the opening 18. The lower curved marginal edge, referring to Figures 1 and 3, of the plate 28 closely fits the inner marginal surface of the flange 12, and opposite this curved surface, the plate 28 is formed with an apertured tab 29, for receiving a single screw bolt 30 which is threadedly received within a screw-threaded aperture formed in the plate section 11. By this construction the single screw bolt 30 holds the plate 28 assembled with the disc means 10, while the curved lower margin of the plate 28 is engageable with the inner terminating margin of the flange 12 to hold the plate 28 against rotation about the screw 30. The plate 28 is provided with elongated slots 31 of such size as to remove certain undesirable foreign material from the fluid passing through the conduit.

To assemble the fluid control means with the conduit, the ferrule 15 is preferably first secured to position within the bell portion of a conduit, and the disc means 10 is then threaded into the ferrule 15, the ferrule 15 and the disc means 10 in the embodiment shown having cooperating pipe threads to form a fluid-tight joint. In some instances, the ferrule 15 may be omitted, and the disc means 10 secured directly in position within the conduit.

The embodiment shown in Figures 1 through 3 is preferably used in a horizontally extending conduit. Fluid flowing in the direction shown by the arrow A passes through the screen means 27 and the opening 18 in the plate section 11 and strikes the flap valve 20 and moves this valve to position uncovering the opening 18, as shown in dotted lines in Figure 1, so that fluid may flow through the opening 18. When fluid flow in the direction of the arrow A ceases, the flap valve 20 is biased to closed position, any fluid attempting to flow in a reverse direction will abut the flap valve 20 and further assist in holding the flap valve in closed position.

The embodiment shown in Figure 4 is somewhat similar to that shown in Figures 1 through 3, and corresponding parts are given the same reference numerals supplemented by the suffix a. In this embodiment, the fluid control means is positioned to cooperate with a substantially vertically extending conduit, and as before may be held in place by a ferrule, or the ferrule may be omitted, and the fluid control means may be positioned within or without the conduit in some suitable manner. In the illustrated embodiment, a ferrule 15a is suitably secured within the bell portion 13a of a conduit 14a, the ferrule having screw-threads at its outer end for receiving the screw-threaded flange 12a of a disc means 10a. The flap valve 20a, in the embodiment shown in Figure 4, is preferably normally biased to open position by its own weight, the extending portion 26a of the flap valve lug 23a limiting such opening movement. Means, responsive to the backing up of fluid within the conduit 14a, is connected to the flap valve 20a, and as here shown, this means comprises a float 32 connected to the flap valve 20a, as by means of a rod 33 carrying the float 32 at one end and having its other end screw-threaded into the flap valve 20a. The float 32 is so positioned as to permit free opening of the flap valve 20a, and thus to provide for flow of fluid in a direction indicated by the arrow A'. However, should the fluid back up in the conduit 14a, or attempt to flow in a direction opposite to that indicated by the arrow A', the float 32 will be moved upwardly by the rising level of the fluid in the conduit 14a, so as to move the flap valve 20a to closed position before the fluid passes up through the opening 18a in the plate 11a. The construction shown in Figure 4 may be advantageously used in combination with a fluid discharge basin, such as the basement basin 34 shown, such basin usually being covered by a grille 35. The basin 34, in this instance, extends downwardly from the floor level, and rests directly on the lip of the bell portion 13a.

The fluid-flow control means forming this invention is particularly useful to prevent sewer back-ups during abnormal conditions, such as during heavy rains, the valve permitting ordinary drainage of fluid from the house, but effectively operating to prevent water from the sewer from backing up through the soil pipes and flooding the house. However, it will be obvious that the invention is not limited to the use herein particularly specified.

From the foregoing it will be apparent to those skilled in the art that I have accomplished at least the principal object of my invention, and it also will be apparent to those skilled in the art that the embodiments herein described may be variously changed and modified, without departing from the spirit of the invention, and that the invention is capable of uses and has advantages not herein specifically described; hence it will be appreciated that the herein disclosed embodiments are illustrative only, and that my invention is not limited thereto.

I claim:

1. A back fluid check, comprising: a flat disc-like plate, having a marginal flange extending away from one surface thereof, and being adapted for disposition across the passage through a conduit, said plate having an opening of a size smaller than the overall size of said plate, said opening being positioned off-center with respect to said plate and having a defining marginal surface generally following the marginal surface of the adjacent portion of said flange, said plate having also ear means extending from its opposite surface; a flat screening plate of a size slightly larger than said opening and overlying said opening, said screening plate having a defining margin fitting said marginal surface of said flange to assist in positioning said screening plate, and said screening plate having an apertured tab; a single screw bolt passing through the aperture in said tab and screw-threaded into an opening in said disc-like plate; and a flap valve pivotally connected to said ear means, and movable to positions covering or uncovering said opening, said flap valve having a portion engageable with said opposite surface of said disc-like plate for limiting opening movement of said flap valve.

2. A back fluid check, comprising: a tubular ring portion, having internal screw-threads at one end, and being adapted for co-axial disposition in the bell of a drain pipe; a flat disc-like plate having a marginal flange extending from one surface thereof, said flange having exterior screw-threads fitting the internal screw-threads of said tubular ring portion so that said disc-like plate is held in position spanning the opening through said tubular ring porton, said plate having an opening of a size smaller than the overall size of said plate, said opening being positioned off-center with respect to said plate and having a defining marginal surface generally following the marginal surface of the adjacent portion of said flange, said plate having also ear means extending from its opposite surface; a flat screening plate of a size slightly larger than said opening and overlying said opening, said screening plate having a defining margin fitting said marginal surface of said flange to assist in positioning said screening plate, and said screening plate having an apertured tab; a single screw bolt passing through the aperture in said tab and screw-threaded into an opening in said disc-like plate; and a flap valve pivotally connected to said ear means, and movable to positions covering or uncovering said opening, said flap valve having a portion engageable with said opposite surface of said disc-like plate for limiting opening movement of said flap valve.

3. A back fluid check, comprising: plate means, adapted for disposition transversely across the passage of a generally vertically extending conduit, and having an opening therethrough, so that when said plate means is in position in the conduit, fluid may flow through said opening and the conduit; screen means, overlying that surface of said plate means which is adapted to be disposed upwardly, and being positioned to prevent passage of objectionable foreign material through said opening; and valve means, comprising a valve member pivoted to that surface of said plate means which is adapted to be disposed downwardly, and also comprising float means rigidly connected to said valve member, the weight of said valve member and said float means being so distributed that said valve member is normally urged to its open position providing for fluid flow through said opening, said float means moving said valve member to its position closing said opening when said float means is engaged by fluid backing up in the conduit; said opening being positioned off-center with respect to the axis of the conduit and the pivot for said valve member being pivoted along that portion of the margin of said opening which is spaced farthest from the conduit wall, so that said valve member and said float means may pivotally move a substantial distance within the conduit.

4. A back fluid check for a generally upright conduit, comprising: a flat disc-like plate, adapted for disposition across the passage through the conduit, having a marginal flange extending from its upwardly disposed surface and having also an opening of a size smaller than the overall size of said plate, said opening being positioned off-center with respect to said plate and having a defining marginal surface generally following the marginal surface of the adjacent portion of said flange, said plate having also ear means extending from its downwardly disposed surface; a flat screening plate of a size larger than said opening and overlying said opening, said screening plate having a defining margin fitting said marginal surface of said flange to assist in positioning said screening plate, and said screening plate having an apertured tab; a single screw bolt passing through the aperture in said tab and screw-threaded into an opening in said disc-like plate; a flap valve pivotally connected to said ear means, and arranged to control flow through said opening, said valve being movable by influence of gravity to open position providing for flow through said opening, and having a portion engageable with said downwardly disposed surface of said disc-like plate for limiting opening movement of said flap valve; and float means, connected to said flap valve, and actuated by fluid backing up in the conduit to move said flap valve to position closing said opening.

DEWEY M. WOLCOTT.